United States Patent [19]

Su

[11] Patent Number: 5,815,090
[45] Date of Patent: Sep. 29, 1998

[54] REMOTE MONITORING SYSTEM FOR DETECTING TERMITES

[75] Inventor: Nan-Yao Su, Plantation, Fla.

[73] Assignee: University of Florida Research Foundation, Inc., Gainesville, Fla.

[21] Appl. No.: 741,952

[22] Filed: Oct. 31, 1996

[51] Int. Cl.⁶ .................................................. G08B 21/00
[52] U.S. Cl. .................. 340/870.16; 340/573; 340/652; 73/865.8; 43/124; 43/132.1
[58] Field of Search .......... 340/870.16, 870.01, 340/573, 652; 73/587, 865.8, 866.5; 43/124, 132.1

[56] References Cited

U.S. PATENT DOCUMENTS

| | | | |
|---|---|---|---|
| 3,564,750 | 2/1971 | Burgess | 43/107 |
| 5,285,688 | 2/1994 | Robbins et al. | 73/587 |
| 5,555,672 | 9/1996 | Thorne et al. | 43/131 |
| 5,564,222 | 10/1996 | Brody | 43/124 |
| 5,571,967 | 11/1996 | Tanaka et al. | 73/865.8 |
| 5,575,105 | 11/1996 | Otomo | 43/132.1 |
| 5,592,774 | 1/1997 | Galyon | 43/124 |

FOREIGN PATENT DOCUMENTS 0 283 142   9/1988   European Pat. Off. .

*Primary Examiner*—Michael Horabik
*Assistant Examiner*—Andrew Hill
*Attorney, Agent, or Firm*—McDonnell Boehnen Hulbert & Berghoff

[57] ABSTRACT

The subject invention pertains to materials and methods useful for monitoring and management of certain pests well as other biotic and abiotic factors. The invention is particularly well suited for the control of social insect pests, and particularly, termites. The invention concerns methods and apparatuses for monitoring pest activity and presenting a toxicant. The invention is useful as part of an Integrated Pest Management Program and can significantly enhance the efficacy, efficiency and convenience of the management program.

20 Claims, 6 Drawing Sheets

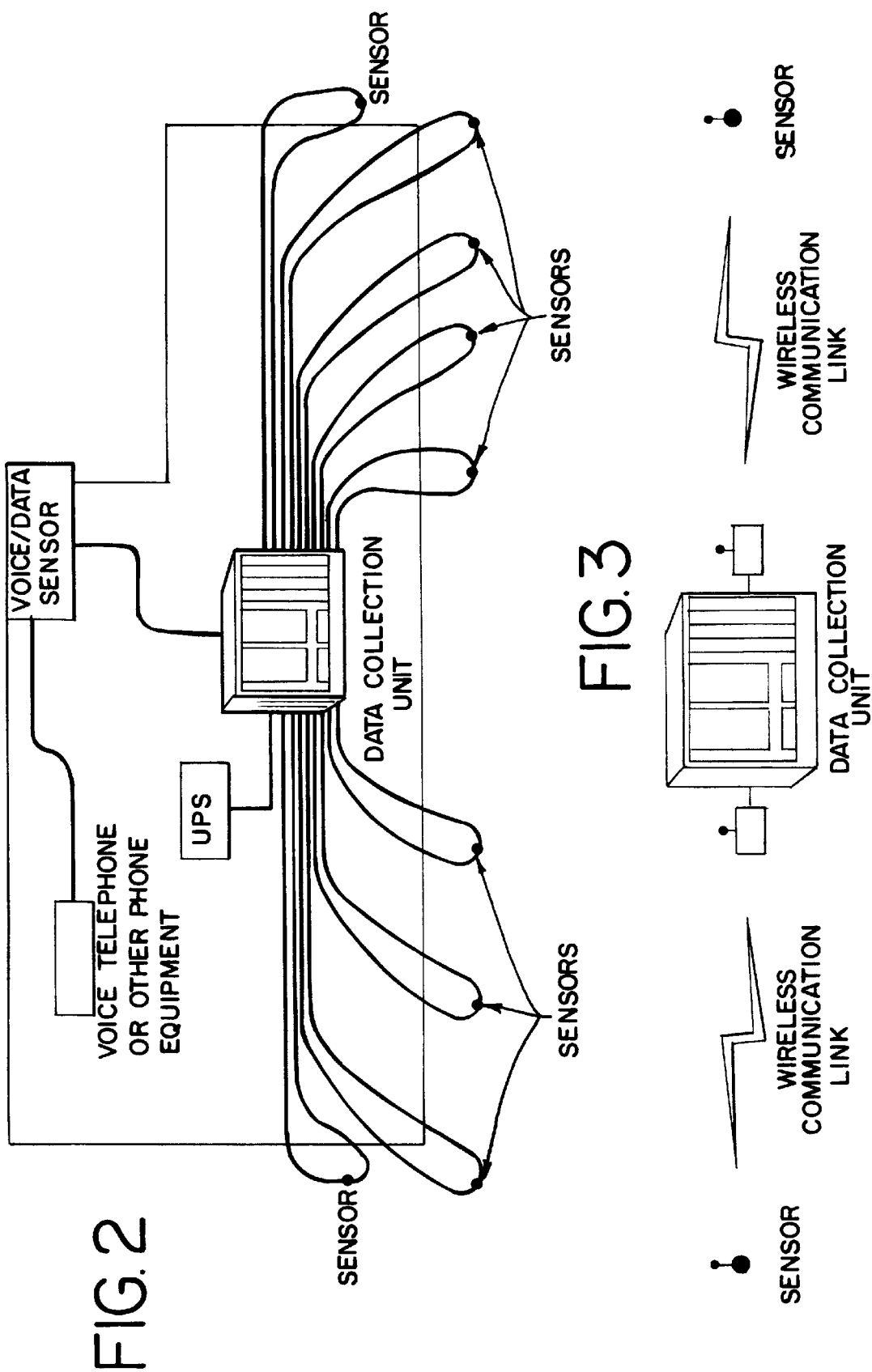

FIG. 8

| TIME | ZONE 1 | ZONE 2 | ZONE 3 | ZONE 4 | ZONE 5 |
|------|--------|--------|--------|--------|--------|
| 0    | 1504   | 2500   | 2499   | 2498   | 2500   |
| 200  | 1029   | 2500   | 2498   | 2497   | 2501   |
| 400  | 1615   | 2501   | 2496   | 2498   | 2500   |
| 600  | 1709   | 2501   | 2497   | 2498   | 2501   |
| 800  | 815    | 2500   | 2497   | 2496   | 2500   |
| 1000 | 466.5  | 2500   | 123.5  | 2499   | 2500   |
| 1200 | 1235   | 2500   | 628.6  | 2496   | 2500   |
| 1400 | 738    | 2502   | 32.02  | 2498   | 2501   |
| 1600 | -163.4 | 2500   | -152.1 | 2496   | 2501   |
| 1800 | 6.005  | 2501   | 473.7  | 2497   | 2501   |
| 2000 | 1274   | 2501   | 1050   | 2493   | 2500   |
| 2200 | 638.6  | 2500   | 2500   | 2492   | 2498   |
| 2400 | -53.39 | 2500   | 2498   | 2496   | 2500   |
| 2600 | 521.3  | 2502   | 2499   | 2499   | 2501   |
| 2800 | -245.6 | 2500   | 2497   | 2497   | 2500   |
| 3000 | 1079   | 2501   | 2502   | 2498   | 2500   |
| 3200 | 343.7  | 2502   | 2500   | 2498   | 2500   |
| 3400 | -190.9 | 2501   | 2499   | 2498   | 2501   |
| 3600 | 897    | 2501   | 2499   | 2499   | 2501   |
| 3800 | 921    | 2502   | 2501   | 2496   | 2500   |
| 4000 | -277.6 | 2502   | 2495   | 2499   | 2502   |
| 4200 | 381.7  | 2500   | 2500   | 2498   | 2500   |
| 4400 | 308.3  | 2500   | 2500   | 2497   | 2500   |
| 4600 | 58.73  | 2500   | 2497   | 2492   | 2500   |

REMOTE MONITORING SYSTEM FOR DETECTING TERMITES

BACKGROUND OF THE INVENTION

Houses and other structures are constantly subjected to damage caused by factors such as, for example, insects, pests, fungi, and excess moisture. Indeed, such factors may even pose a risk to the well-being for the inhabitants. Inspections for damage caused by these and other factors are typically conducted manually at either regular intervals or on an as-needed basis. Manual inspections, however, are often costly because inspectors must be present at the site. Moreover, manual inspections of this nature may prove to be quite invasive, insofar as inaccessible or otherwise remote portions of a given structure may require significant disturbance to walls, ceilings, etc., thereby resulting in added inconvenience and expense. Further, if the manual inspections are not conducted in a timely fashion, severe damage to the structure may have already occurred by the time the damage is revealed through a manual inspection. This can be especially true if the damaging factor is subterranean termites.

Subterranean termites most often enter structures from the surrounding soil to feed on wood, or other cellulosic material, of the structure and its contents. If unchecked, termites can cause considerable damage. As a result, efforts to erect physical or chemical barriers to prevent the entrance of termites into a structure or to exterminate the termites after they have invaded a structure have proven a considerable expense to the public (Su, N. Y., J. H. Scheffrahn [1990] Sociobiol. 17(1):77–94). The cost to control termites in the United Stated exceeds one billion dollars annually (Mauldin, J. K. S. C. Jones, R. H. Beal [1987] The International Research Group on Wood Preservation Document No. IRG/WP/1323).

Subterranean termites construct an extensive foraging gallery beneath the soil surface. A single colony may contain several million termites with foraging territory extending up to 300 feet (Su, N. Y., R. H. Scheffrahn [1988] Sociobiol 14(2):353–359). Since subterranean termites are a cryptic creature, their presence is not normally known until after some damage, foraging tubes, or live termites such as swarmers, are found. Some subterranean termites are know to forage beneath an object on the soil surface (Ettershank, G., J. A. Ettershank, W. G. Whitford [1980] Environ. Entomol 9:645–648).

Certain methods and apparatuses have been suggested to monitor for and control pests such as subterranean termites. For example, International Publication No. WO 93/23998 (Dec. 9, 1993) discloses methods and materials for pest management which include a series of connected monitoring blocks that are placed in soil adjacent to and surrounding a structure foundation. A thin strip of conductive metal is embedded in each monitoring block such that a contiguous circuit is formed by the connected monitoring blocks. Severe infestation by termites in the monitoring block results in the breaking of the contiguous circuit, which can be registered by an electronic device. Despite its many advantages, however, an arrangement of this sort can be relatively cumbersome in particular applications. This arrangement also requires the presence of a technician to conduct on-site monitoring. Moreover, since the point of circuit breakage cannot be readily isolated, it sometimes may be difficult to promptly determine the precise location of sensed termites.

It is therefore highly desirable to more efficiently and effectively monitor for biotic and abiotic factors, such as insects and other pests, fungi, and excess moisture, so as to minimize damage that may be caused by such factors. It is especially desirable to more efficiently and effectively monitor for the presence of subterranean termites.

Other objects and advantages of the present invention will be apparent to those of skill in the art, based upon the figures and the following description.

BRIEF SUMMARY OF INVENTION

The invention disclosed and claimed herein relates to a system useful in monitoring for a variety of biotic and abiotic factors, and perhaps most advantageously in monitoring for insects and other pests. Specifically exemplified herein is a system useful in monitoring for insects of the order Isoptera, particularly, termites.

One preferred system is useful in the monitoring phase or step of a two-step process for controlling termites, wherein one step is monitoring and the second step is control. The system of the present invention may conveniently provide for efficient monitoring of a given site for pest and/or other target factors. The resulting reduced or eliminated need for on-site manual inspections may allow for more comprehensive monitoring. Zones having at least one sensor each are checked on demand or pursuant to a specified schedule. If desired, the system may be configured in a manner that allows the location of sensed termite activity to be associated with a particular sensor or group of sensors. Data relating to the status of the sensors may be forwarded or retrieve for storage, recordal, review and/or analysis at a remote location. The system can be configured to conveniently provide for monitoring and other data exchange between the target site and remote locations using existing communications means.

As described more fully herein, there are a variety of methods and apparatuses which can be used to realize the system of the subject invention. The precise methods and apparatuses which would be optimal for a particular target factor and environmental setting would be apparent to a person skilled in this art of using the teachings provided herein.

BRIEF DESCRIPTION OF THE DRAWINGS

FIG. 2 shows a schematic representation of another example remote monitoring system configuration, including a data collection unit that communicates with a plurality of sensors using a plurality of individual communication links.

FIG. 3 shows a schematic representation of another example remote monitoring system configuration, including a data collection unit that communicates with sensors using individual wireless communication links.

FIG. 8 is a chart setting forth the data plotted on the graph of FIG. 7.

DETAILED DISCLOSURE OF THE INVENTION

Figure 1:
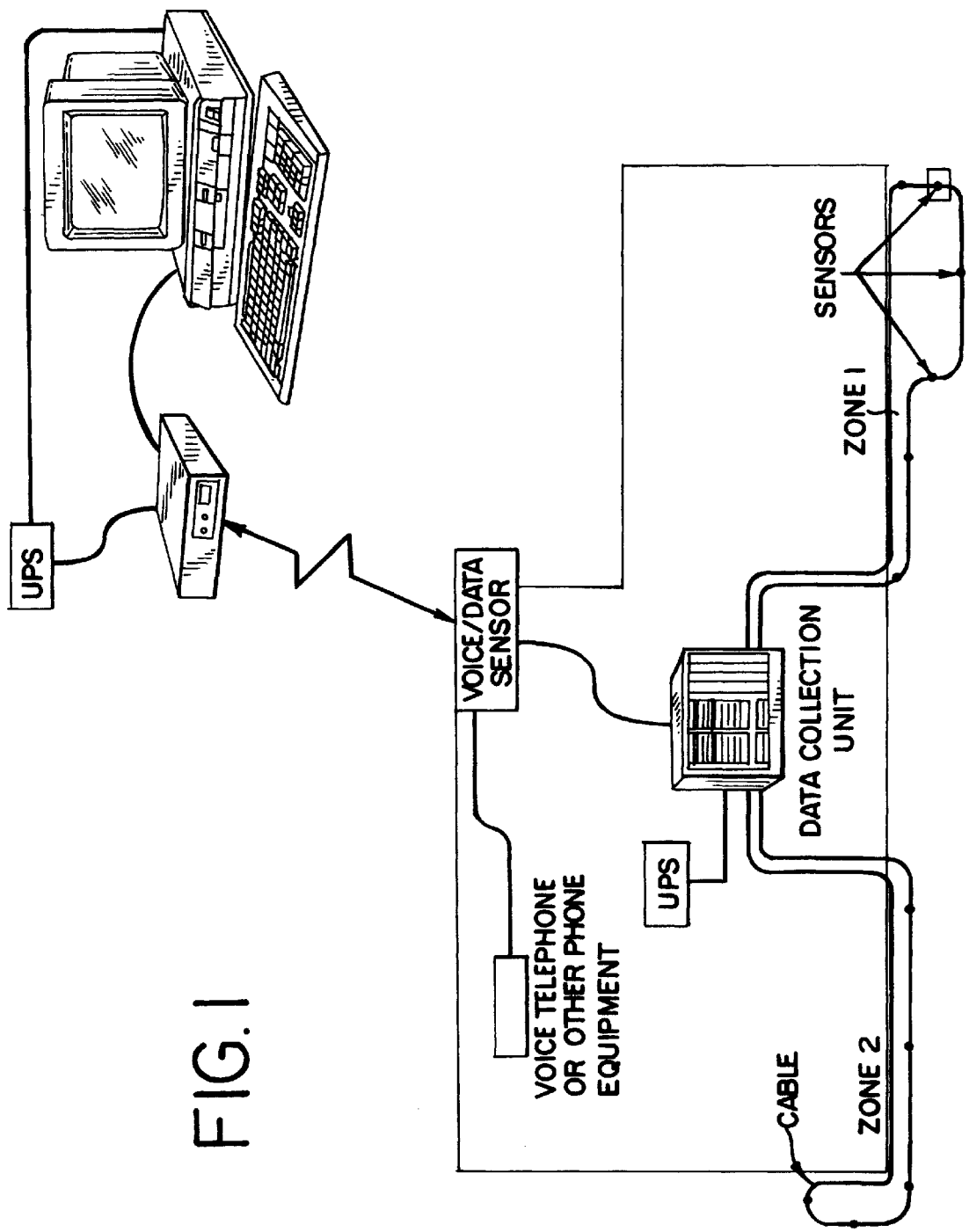
FIG. 1 shows a schematic representation of an example remote monitoring system, including a data collection unit that communicates with a host system at a remote location to provide data obtained from sensors located at the target site.

The preferred embodiment of the subject invention pertains to novel methods and apparatuses to monitor for biotic and abiotic factors. The described methods and apparatuses can be used, for example, to monitor for pests of the order Isoptera, and is particularly useful for monitoring populations of subterranean termites. It would be readily apparent to persons of ordinary skill in the art that the method and apparatuses are adaptable to, for example, a variety of pest species. For purposes of brevity, however, the emphasis herein is directed to subterranean termites.

The preferred embodiment of the invention is an integral part of an integrated pest management system featuring two repeatable steps: (1) population monitoring/capturing (hereinafter referred to as monitoring), and (2) delivery of a toxicant to a pest through the use of a toxicant-containing matrix. The monitoring step of the process comprises monitoring particular location or locations to detect any termite activity. This step may further comprise capturing termites. The toxicant delivery step involves providing a slow-acting toxicant in a matrix which is eaten or otherwise contacted by the termites. The slow-acting toxicant allows termites to return to and move through their colony territory before dying. Nestmates then follow the trail back to the toxicant. As described more fully herein, the two principal steps described herein can be repeated as part of a pest management program wherein the program involves the initial step of monitoring for pest activity followed by control if pest activity is observed. Once control is achieved, monitoring can be continued. The steps may also be performed simultaneously. A suitable monitoring/control apparatus and method of use is disclosed in International Publication No. WO 93/239998 (Dec. 9, 1993), the disclosure of which is incorporated herein by reference.

One example of how methods of the subject invention can be applied to the control of subterranean termites is as follows:

A hole of appropriate dimension can be made in the soil for positioning of the station housing. The station housing is placed into the hole. The monitoring device is placed inside the station housing. A cover can be placed over the station housing and the cover secured to the surface of the ground. Alternatively, the monitoring device can be placed inside station housing which is then inserted or hammered into the soil until the station housing opening is near the soil surface. Also, the monitoring article or station housing may be placed horizontally on the ground or beneath the soil surface.

The monitoring device can be interrogated periodically for evidence of termite infestation. Inspection of the monitoring device can be performed weekly, bi-weekly, monthly, etc. as needed or desired. Because termites are known to chew through soft metal, thin strips of conductive metal may be incorporated into the monitoring device and connected to an electronic device. When termites chew through the thin metal, the circuit is broken, thus evidencing the presence of termites.

A preferred remote monitoring system of the present invention is shown schematically for example in the figures. The system includes sensors that are strategically located about the target area. Given the particular application of the present invention described herein, each sensor preferably includes a monitoring device or block, such as cellulose or another material which is edible by termites, having an associated bridging circuit through which termites are capable of chewing. The monitoring device, including the associated bridging circuit, are placed within a monitoring station housing.

In one embodiment, each bridging circuit of each sensor is connected to a cable which links the sensor with an on-site data collection unit. Various runs of cables may be used to create a plurality of individual zones of sensors so as to provide more detailed information regarding the precise location of detected termite activity, each zone having its own individual cable link to the data collection unit. In this way the presence of termites in one zone may be determined independently of other zones.

Each zone may contain a few as one sensor, as is shown for example in FIG. 2, or as many as a plurality of sensors, as is shown for example in FIG. 1. Instead of hard-wire components, such as cables, the system may instead be configured such that the sensors communicate with the data collection unit over independent wireless links formed using wireless communication devices, as shown for example in FIG. 3. The on-site data collection unit is configured to register data relating to each sensor or groups of sensors either continuously, or at regular intervals (such as hourly, daily, weekly, etc.), or pursuant to a specified schedule, or on demand (real-time monitoring).

A remote host processor, such as a computer for example, is programmed to retrieve or down load data from the on-site data collection unit via a communications link, such as a standard telephone land line or wireless communication means. Again, the down loading of such information may occur either continuously, or at regular intervals (monthly, bi-monthly, quarterly, bi-annually, etc.), or pursuant to a specified schedule, or on demand. The data may then be stored, recorded, reviewed and/or analyzed at a remote location. The down loaded data in system described herein may be used for a variety of purposes by, for example, pest control personnel, inspectors, property managers, and/or regulatory agencies.

When the communication link between the host computer and the data collection unit is a telephone line that supports both voice and data communications, a voice/data recognition switch or sensor is preferably used in association with the data collection unit so as to direct any communications requests placed by the host computer directly to the data collection unit, rather than unnecessarily disturb those individuals attending to voice communication operations on the telephone line. Alternatively, a separate line may be use for such communication.

More specifically, the host computer shown for example in FIG. 1 is located at a remote location and is preferably programmed to periodically establish communications with the data collection unit. Once communications are established, the host computer presents an identification protocol to the data collection unit so as to gain access to the information communicated by the unit. Once access is established, the host computer issues a command to the data collection unit so as to initiate the down loading of data maintained in a memory storage device portion of the data collection unit.

The data collection unit shown for example in FIG. 1 includes the memory storage device on which are stored instructions to be carried-out by the data collection unit to collect data relating to the sensors. The memory storage device may include conventional memory chip or hard disk components. Collected data is retained in the storage device for anticipated retrieval by or down loading to the host computer. In the case of monitoring on demand or real-time monitoring, a data storage device is not needed. The data collection unit also includes multiple ports or input/output (I/O) outlets which may be used to connect the cables that provide the communication between the sensors and the data collection unit. The data collection schematically represented in FIG. 1, for example, communicates with two independent zones of sensors; Zone 1 having six sensors therein, and Zone 2 having five sensors therein. The data collection unit schematically represented in FIG. 2, on the other hand, communicates individually with a plurality of independent sensors. Further, a modem and related software are provided to establish the necessary communications link when the data collection unit is accessed by the host computer.

All of the above data collection unit elements may be incorporated into a Programmable Logic Controller. Alternatively, a suitable data collection unit may be configured using either a Personal Computer (PC) or a compact single board. The data collection unit may interface with the sensors through an analog/digital converter. Regardless of its precise construction, the data collection unit can be programmed to register data relating to line continuity, circuit resistance, moisture, and other conditions that can be sensed and identified using electronic signals and sensors. The data registered by the on-site data collection unit of the preferred system, for example, relates to at least one electrical circuit characteristic, such as for example line resistance or line voltage.

Figure 4:
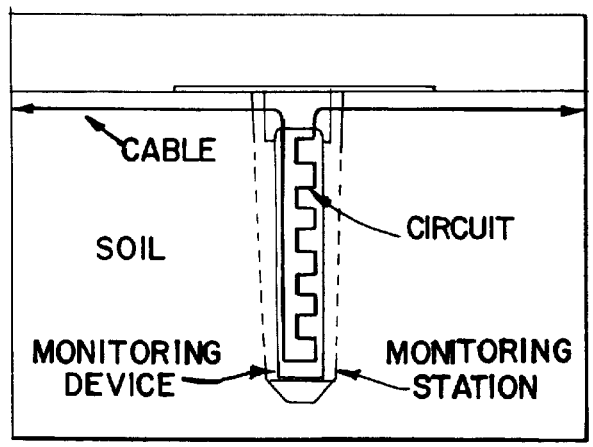
FIG. 4 shows an example sensor used in the remote monitoring systems shown for example in FIGS. 1 and 2, the sensor being placed in a monitoring station housing and connected to a cable which communicates with the data collection unit.
Figure 5A:
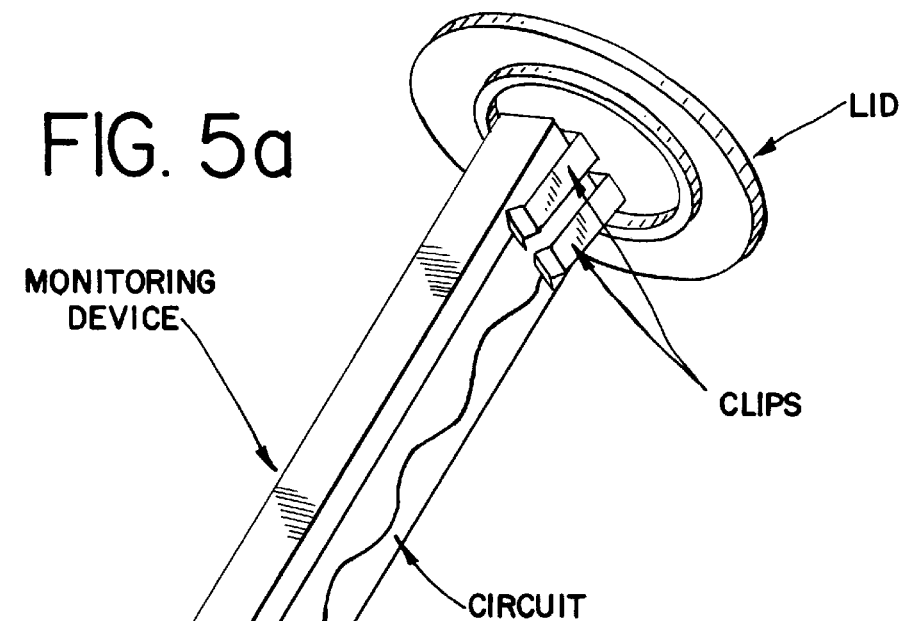
FIG. 5a and 5b show two views of an example monitoring station housing lid and attached monitoring device, with sensor circuit thereon, for use in connection with a remote monitoring system of the present invention.
Figure 5B:
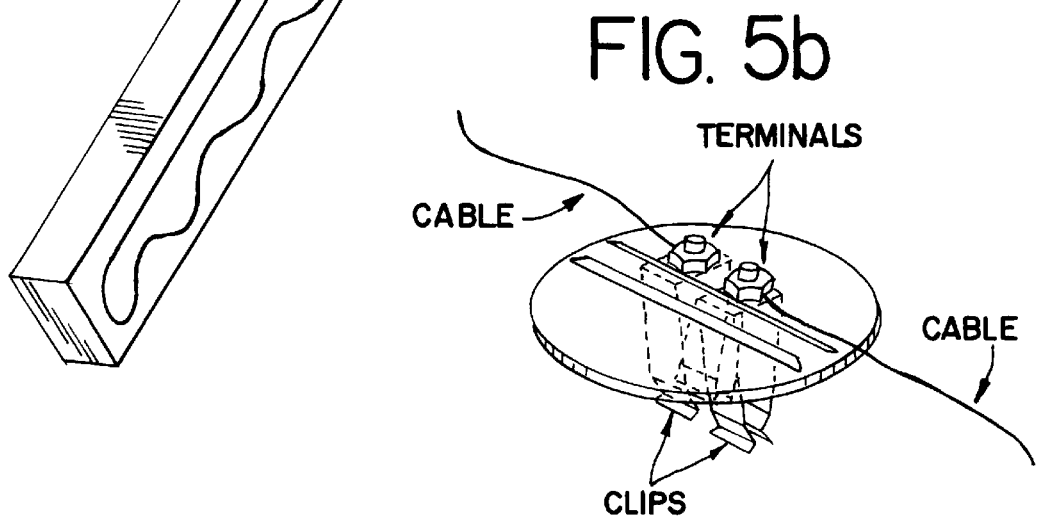

The preferred remote monitoring sensor for the termite application described herein is shown at FIG. 4, for example, disposed within a monitoring station housing. A thin line (ca. 2 mm width) of silver particle (<10 microns) is drawn in a zigzag pattern on the surface of the monitoring device, using a circuit works conductive pen. Another layer of plastic film may thereafter be placed over monitoring device so as to envelope the circuit for protection of the circuit from potential corrosion. The drawn circuit on the monitoring device interfaces with the zone cable to establish a close circuit. The monitoring device, including its respective drawn circuit leads, is preferably removably connected to the underside portion of the monitoring station housing lid using electrically isolated conductive clips, as shown for example in FIG. 5a. As shown in FIG. 5b, for example, each of the terminals disposed on the top surface of the monitoring station housing lid is in electrical communication with the underlying clip to provide for convenient connection of the sensor bridging circuit to the associated cable.

The preferred remote monitoring device is composed of cellulose materials that are intended to be fed upon by termites. As shown for example in FIG. 4, the sensor, or monitoring device with associated circuit, is placed in the monitoring station housing that is planted in soil. Termite feeding in sensors can be readily detected as termites easily chew through the relatively thin circuit tracing while chewing the cellulose material. Preliminary studies indicate that, even under a humid and warm climate, the sensor circuit may remain conductive for a long as six months or more in the absence of termite activity.

A sensor placed in humid soil, however, may absorb sufficient moisture to become conductive under certain conditions even when the circuit is broken by termite feeding. This situation may be avoided through the use of analog signals to test the circuit, rather than digital signals. By quantifying the drastic increase in circuit resistance (using the analog signals) when the circuit is broken by termites, instead of using qualitative testing of the circuit conductivity (using digital signals), the frequency of false positive as a result of moisture or other external influences can be minimized or even eliminated altogether.

Figure 6:
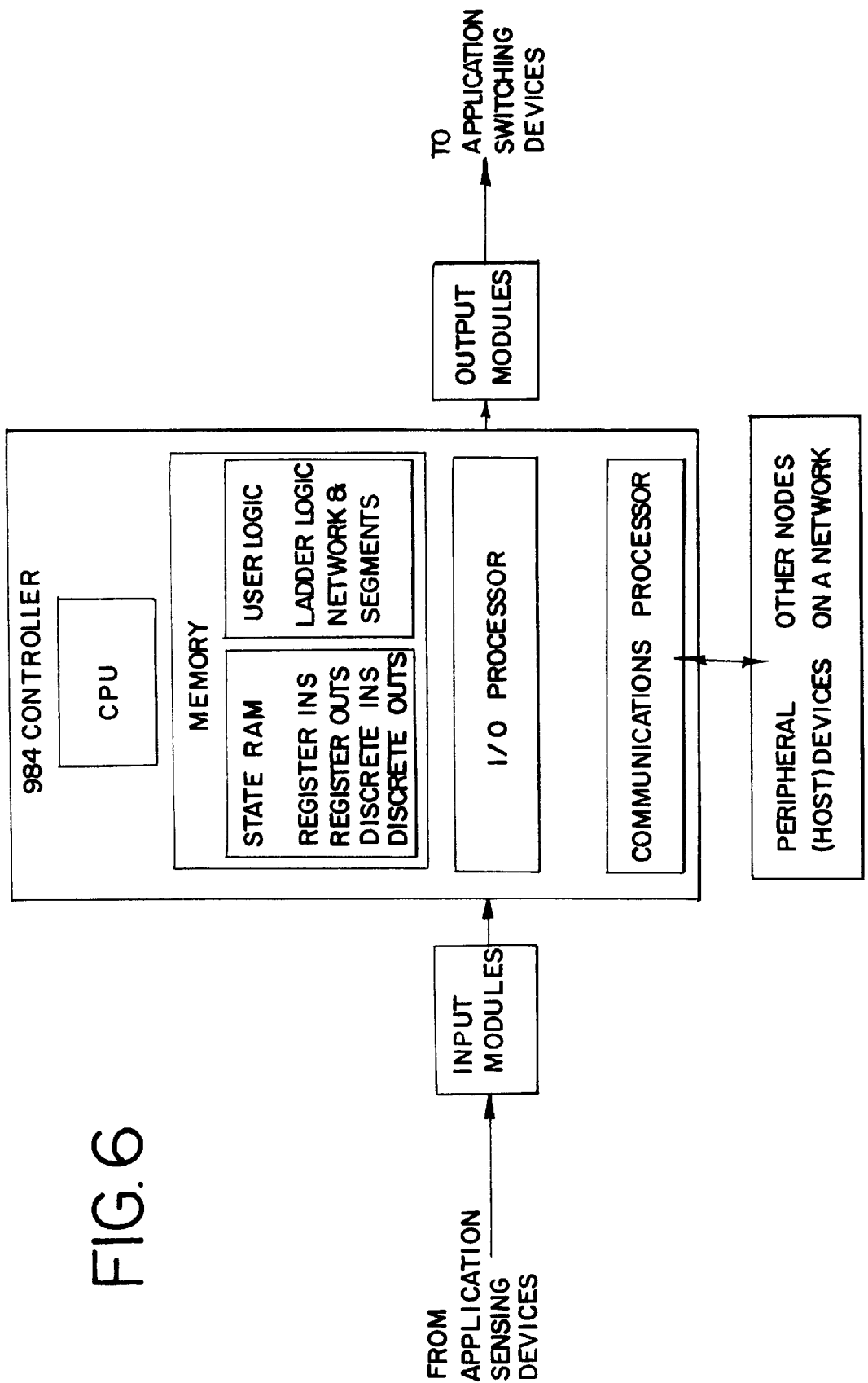
FIG. 6 shows a schematic representation of an example controller for use with the remote monitoring system of the present invention.

A prototype remote monitoring system was constructed using two 8-conductor cables (in and out) connecting a total of eight sensors and the I/O ports of a Compact-984 Controller (984-A120 Compact Programmable Controller, MODICON, Inc., Industrial Automation Systems, One High St., North Andover, Mass. 018450). The architecture of the controller is shown schematically, for example, in FIG. 6. The controller was programmed with a ladder logic software Modsoft Lite™ (371SPU921000, MODICON, Inc.) that used to constantly monitor the integrity of the electric circuits of the eight connected sensors. Modsoft Lite records the time and the date of the event, i.e. circuit interruption, and stores the data in the controller memory. An internal modem in the controller allows the stored information to be down loaded to a host computer via telephone line. A voice/data recognition switch (Fax Line Manager™, Technology Concepts, Inc.) was connected between the controller's modem and the telephone outlet to direct the call made by the host computer to the Compact-984 Controller. The Modsoft Lite was also loaded in a host computer (4DX-66V, Gateway 2000, 610 Gateway Dr., N. Sioux City, S.D. 57049) equipped with an internal modem (TelePath Data/Fax modem). After establishment of communication between the host computer and the Compact-984 Controller using Crosstalk™ (Digital Communications Associates, Inc.), data stored in the Compact-984 Controller was down loaded using the Modsoft Lite.

In a preliminary experiment, four of the eight sensors were exposed to a laboratory colony of the Formosan subterranean termites, while the other four sensors were left in sand without termite activity. Within a week of exposure, the time and date of circuit interruption or breakage of the four sensors exposed to termites were accurately recorded and down loaded to the host computer.

A second prototype remote monitoring system included a datalogger (CR10X, Campbell Scientific, Inc., Logan UT), or data collection unit, that communicates with five independent zones of sensors placed in soil surrounding a house structure. A multiplexer (AM416, Campbell Scientific, Inc.) is incorporated into the datalogger to allow the datalogger to monitor multiple I/O ports relating to the various sensor zones. The datalogger is designed to check circuit integrity by applying a voltage of 2,500 mV to each zone. When a given zone circuit is continuous, the voltage registered by the datalogger is approximately 2,500 mV. The multiplexer is programmed to examine the circuit integrity at a set interval, and the data is stored in the Static Random Access Memory (SRAM) of the datalogger. A Selective Ring Call Processor (SR3, Multi-Link, Inc., Nicholasville, Ky.) is placed between the incoming telephone line of the house and the datalogger. A RingMaster service was purchased to obtain a second telephone number with a distinctive ring for the telephone line of this house. A host computer (Dell Dimension XPS P166c) is configured to dial the datalogger, which is located remotely with respect to the host computer, using the RingMaster telephone number. The SR3 device senses the distinctive ring assigned for this number and directs the incoming host computer call to the datalogger. The host computer then establishes the communications link with the datalogger and downloads stored data relating to circuit continuity. If desired, the host computer can be programmed to auto-dial the datalogger at any time or ant any desired interval.

Figure 7:
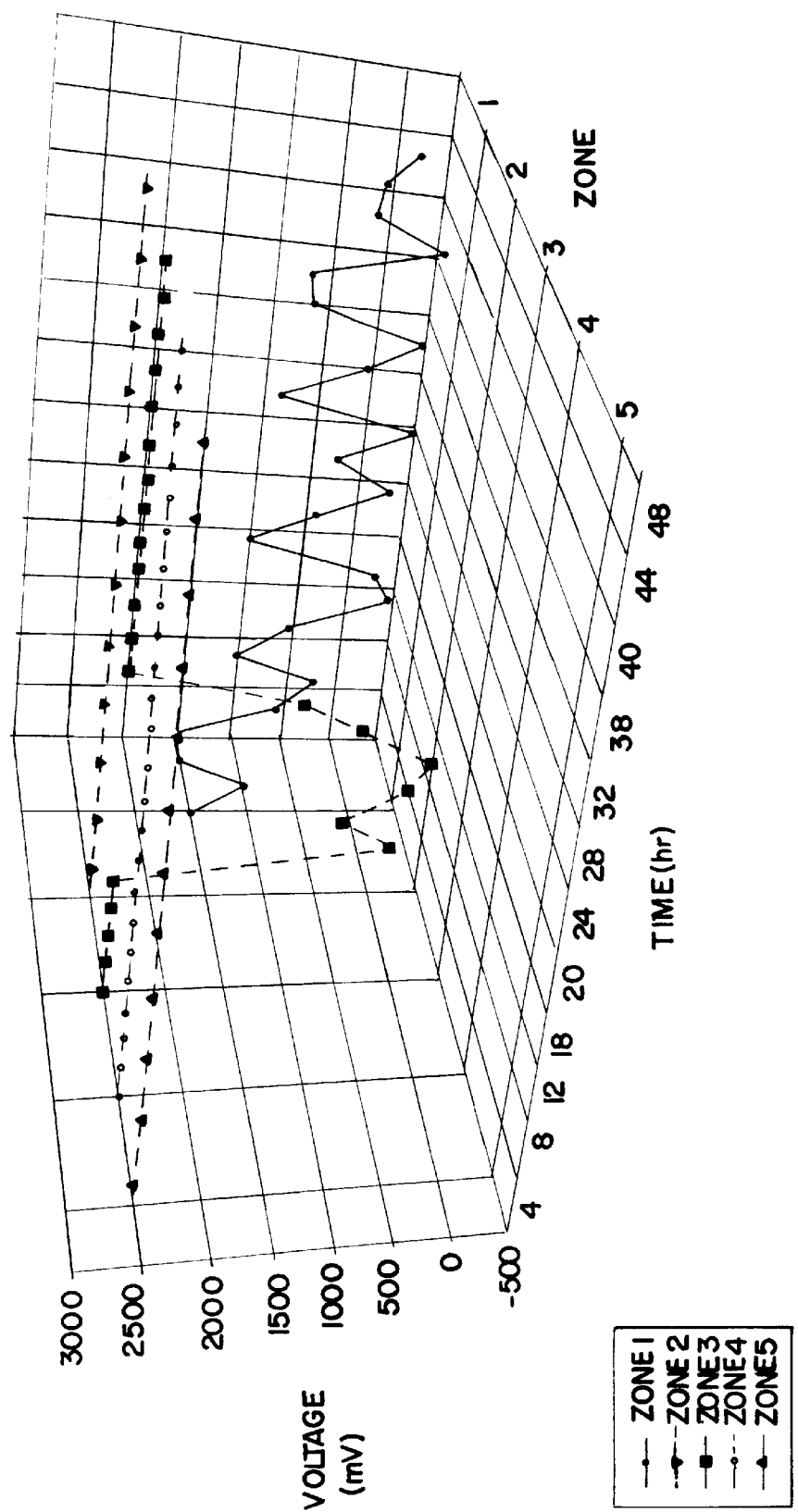
FIG. 7 shows a graph illustrating an example 48-hour reading for Sensor Zones 1–5 for an example remote monitoring system of the present invention.

Data obtained using this second prototype system is set forth at FIGS. 7 and 8, showing circuit interruption in Zones 1 and 3 during an example 48-hour reading for five-zones. A line voltage of approximately 2500 mV was applied to the sensor circuit. A registered line voltage of approximately 2500 mV was obtained when the circuit was tested, provided circuit integrity was maintained. If the circuit was broken (as it would be by sufficient termite activity), however, the registered line voltage deviated significantly from the 2500 mV value.

Specifically, Zone 1 was intentionally broken as a part of the preliminary experiment to simulate termite feeding. Accordingly, the registered line voltage in Zone 1 fluctuated during the course of the 48-hour test. Similarly, Zone 3 was intentionally broken between 1000 hour and 2000 hour, resulting in a fluctuating registered line voltage. The marked differences in the character of the registered line voltages for Zones 2, 4 and 5 as compared to Zones 1 and 3 demonstrate how actual termite feeding in a particular zone of a target area can evidence itself through the use of the present invention.

Although the sensors described herein for the remote monitoring system are designed to use circuit interruption to detect the presence of termites, other sensors such as moisture meters strategically placed in structural wood to detect potential moisture problem, acoustic emission devices to detect feeding activity of other wood destroying insects such as drywood termites, powderpost beetles, wood borers, or a miniature digital balance for measuring weight loss of cockroach or ant bait stations, may be used in accordance with the present invention.

Upon the detection of the presence of termites in the monitoring device, the monitoring device can be removed from the station housing (or soil) and replaced with a toxicant-containing matrix, in a toxicant delivery device (bait tube). Termites that are captured in the monitoring device can be extracted and gently tapped into an upper chamber of the toxicant delivery device. This upper chamber is the recruiters' chamber. In order to exit, the termites must then move through the toxicant-containing matrix to reach the exit points. No toxicant needs to be used unless termites are detected from the monitoring procedure (or are otherwise known to be present), thereby eliminating the use of any unnecessary toxicant. When termites are detected, the toxicant-containing matrix is utilized until no termite activity is detected in the toxicant delivery device. At that time, monitoring devices can be used again. In addition to the practice of replacing monitoring devices with toxicant delivery devices, another embodiment of the invention comprises a monitoring device which remains in place and a toxicant delivery device which can be added to, or fitted around, the monitoring device if the need arises to deliver toxicant.

The various methods, materials and apparatuses for preparation of toxicant-containing matrices, including matrices treated with dyes and/or hexaflumuron, will be readily apparent to those skilled in the art. Moreover, the various methods, materials and apparatuses for preparation of various station housings, including horizontal station housings and station housings for above-ground monitoring and toxicant delivery, will also be readily apparent to those skilled in the art. Moreover, those skilled in the art will recognize that the procedures, materials, and apparatuses of the present invention can be readily adapted for use for the control of termites and/or other pests attacking croplands, forests, golf courses, and other non-structural targets.

In sum, it should be understood that the examples and embodiments described herein are for illustrative purposes only and that various modifications or changes in light thereof will be suggested to persons skilled in the art are to be included within the spirit and purview of this application and the scope of the appended claims.

I claim as my invention:

1. A system to monitor for termites in a plurality of zones, comprising:

at least one termite sensor adapted for placement in each of said zones, each of said termite sensors including at least one monitoring block made of termite edible material and an electrical conductor positioned adjacent to or embedded in the at least one monitoring block, the electrical conductor being made of a material that is breakable by termite feeding, the electrical conductor forming a continuous electrical bridging circuit such that when termite feeding breaks the electrical conductor, the continuous electrical bridging circuit is broken;

a data collection unit communicating with said at least one termite sensor in each zone independently of termite sensors in other zones, said data collection unit being capable of registering the presence of termites at any of said zones independently of other zones; and a host processor for communicating with said data collection unit from a remote location to retrieve data relating to the presence of termites.

2. The system to monitor for termites as set forth in claim 1, wherein said data collection unit communicates with said at least one termite sensor in each zone through a cable extending independently between said data collection unit and said zone.

3. The system to monitor for termites as set forth in claim 1, wherein said data collection unit registers a circuit characteristic for each of said zones to determine the electrical integrity of said continuous bridging circuit at each of said sensors.

4. The system to monitor for termites as set forth in claim 1, wherein said at least one monitoring block is adapted to be received in a monitoring station housing.

5. The system to monitor for termites as set forth in claim 4, wherein said monitoring station housing comprises at least one termite opening thereby providing termite access to said monitoring block and said electrical conductor.

6. The system to monitor for termites as set forth in claim 4, wherein said at least one monitoring block is adapted to be attached to a removable lid of said monitoring station housing.

7. The system to monitor for termites as set forth in claim 6, wherein a bottom portion of said lid of said monitoring station housing includes electrically isolated conductive clips to receive said at least one monitoring block, said conductive clips being aligned with respective ends of said electrical conductor and in electrical communication with terminals disposed on a top portion of said lid.

8. The system to monitor for termites as set forth in claim 1, wherein said data collection unit communicates with said at least one termite sensor through an independent wireless lid between said data collection unit and said zone.

9. The system to monitor for termites as set forth in claim 1, wherein said electrical conductor comprises an electrically conductive line of less than 10 micron silver particles on the surface of the monitoring block.

10. The system to monitor for termites as set forth in claim 9, wherein the monitoring block is enveloped by plastic.

11. A method to monitor for termites in a plurality of zones, said method comprising the steps of:

placing at least one termite sensor in each of said zones, each of said termite sensors including at least one monitoring block made of termite edible material, and an electrical conductor positioned adjacent to or embedded in the at least one monitoring block, the electrical conductor being made of a material that is breakable by termite feeding, the electrical conductor forming a continuous electrical bridging circuit such that when termite feeding breaks the electrical conductor, the continuous electrical bridging circuit is broken;

establishing communication with said at least one termite sensor in each zone using a data collection unit configured to register the presence of termites at any of said zones independently of other zones; and communicating from a remote location through a host processor with said data collection unit to retrieve data relating to the presence of termites.

12. The method to monitor for termites as set forth in claim 11, including the step of communicating through said data collection unit with said at least one termite sensor in each zone through a cable extending independently between said data collection unit and said zone.

13. The method to monitor for termites as set forth in claim 11, including the step of registering said data collection unit by using a circuit characteristic for each of said zones to determine the electrical integrity of said continuous bridging circuit at each of said sensors.

14. The method to monitor for termites as set forth in claim 11, wherein said at least one monitoring block is adapted to be received in a monitoring station housing.

15. The method to monitor for termites as set forth in claim 14, wherein said monitoring station housing comprises at least one termite opening thereby providing termite access to said monitoring block and said electrical conductor.

16. The method to monitor for termites as set forth in claim 14, wherein said at least one monitoring block is adapted to be attached to a removable lid of said monitoring station housing.

17. The method to monitor for termites as set forth in claim 16, wherein a bottom portion of said lid of said monitoring station housing includes electrically isolated conductive clips to receive said at least one monitoring block, said conductive clips being aligned with respective ends of said electrical conductor and in electrical communication with terminals disposed on a top portion of said lid.

18. The method to monitor for termites set forth in claim 11, including the step of communicating through said data collection unit with said at least one termite sensor in each zone through an independent wireless link between said data collection unit and said zone.

19. The system to monitor for termites as set forth in claim 11, wherein said electrical conductor comprises an electrically conductive line of less than 10 micron silver particles on the surface of the monitoring block.

20. The system to monitor for termites as set forth in claim 19, wherein the monitoring block is enveloped by plastic.

* * * * *